(12) United States Patent
Sakurai et al.

(10) Patent No.: US 10,696,122 B2
(45) Date of Patent: Jun. 30, 2020

(54) VEHICLE STABILIZER, PROCESSING DEVICE FOR EYE PORTION OF STABILIZER, AND PROCESSING METHOD FOR EYE PORTION

(71) Applicant: NHK SPRING CO., LTD., Yokohama-shi, Kanagawa (JP)

(72) Inventors: Yasuharu Sakurai, Yokohama (JP); Yoshihiro Koshita, Yokohama (JP); Akihiko Nishikawa, Yokohama (JP); Akifumi Otani, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 176 days.

(21) Appl. No.: 15/954,793

(22) Filed: Apr. 17, 2018

(65) Prior Publication Data

US 2018/0229576 A1 Aug. 16, 2018

Related U.S. Application Data

(63) Continuation of application No. PCT/JP2016/079860, filed on Oct. 6, 2016.

(30) Foreign Application Priority Data

Oct. 20, 2015 (JP) ................................. 2015-206589

(51) Int. Cl.
*B60G 21/055* (2006.01)
*B21J 9/04* (2006.01)
(Continued)

(52) U.S. Cl.
CPC .......... *B60G 21/055* (2013.01); *B21D 28/02* (2013.01); *B21D 28/24* (2013.01); *B21D 45/006* (2013.01);
(Continued)

(58) Field of Classification Search
CPC .. B60G 21/005; B60G 21/026; B60G 21/055; B60G 2206/017; B60G 2206/427;
(Continued)

(56) References Cited

U.S. PATENT DOCUMENTS 4,292,368 A * 9/1981 Mialon ................... B29C 57/00
156/172
4,781,054 A 11/1988 Brown et al.
(Continued)

FOREIGN PATENT DOCUMENTS

| CN | 202270820 U | 6/2012 |
| EP | 0851131 A2 | 7/1998 |

(Continued)

OTHER PUBLICATIONS

Chinese Office Action (and English language translation thereof) dated Jan. 14, 2019 issued in Chinese Application No. 2016800599481.
(Continued)

*Primary Examiner* — Laura Freedman
(74) *Attorney, Agent, or Firm* — Holtz, Holtz & Volek PC

(57) ABSTRACT

An annular reference surface is formed around a through-hole of an eye portion. A distal-end-side curved portion is formed at a first corner portion, on an outer side of the annular reference surface. The thickness of the distal-end-side curved portion is reduced in a range of a length from the first flat surface toward the distal end surface. A hole-side curved portion whose thickness is reduced toward an inner surface of the through-hole is formed at a second corner portion, on an inner side of the annular reference surface. The length of the hole-side curved portion is less than the length of the distal-end-side curved portion. The hole-side curved portion is curved with a greater curvature than that of the distal-end-side curved portion.

6 Claims, 9 Drawing Sheets

(51) Int. Cl.
  *B21J 9/12* (2006.01)
  *B21D 28/02* (2006.01)
  *B21J 5/10* (2006.01)
  *B21D 53/88* (2006.01)
  *B21D 45/00* (2006.01)
  *B21J 5/02* (2006.01)
  *B21D 28/24* (2006.01)
  *B21K 21/12* (2006.01)
  *B60G 21/00* (2006.01)
  *B60G 21/02* (2006.01)
  *B21K 21/14* (2006.01)

(52) U.S. Cl.
  CPC ............... *B21D 53/88* (2013.01); *B21J 5/02* (2013.01); *B21J 5/10* (2013.01); *B21J 9/04* (2013.01); *B21J 9/12* (2013.01); *B21K 21/12* (2013.01); *B60G 21/005* (2013.01); *B60G 21/026* (2013.01); *B21J 5/022* (2013.01); *B21J 5/027* (2013.01); *B21K 21/14* (2013.01); *B60G 2206/017* (2013.01); *B60G 2206/427* (2013.01); *B60G 2206/724* (2013.01); *B60G 2206/811* (2013.01); *B60G 2206/8103* (2013.01); *B60G 2206/81022* (2013.01); *B60G 2206/83* (2013.01)

(58) Field of Classification Search
  CPC .... B60G 2206/724; B60G 2206/81022; B60G 2206/8103; B60G 2206/811; B60G 2206/83; B21D 28/02; B21D 28/24; B21D 45/006; B21D 53/88; B21J 5/02; B21J 5/022; B21J 5/027; B21J 5/10; B21J 9/04; B21J 9/12; B21K 21/12; B21K 21/14
  See application file for complete search history.

(56) References Cited

U.S. PATENT DOCUMENTS

| | | | |
|---|---|---|---|
| 5,885,688 | A | 3/1999 | McLaughlin |
| 6,030,570 | A | 2/2000 | McLaughlin |
| 7,896,983 | B2 | 3/2011 | Koyama et al. |
| 9,233,408 | B2 | 1/2016 | Asahi |

FOREIGN PATENT DOCUMENTS

| | | | | |
|---|---|---|---|---|
| JP | S5785310 | U | | 5/1982 |
| JP | 57124533 | A | | 8/1982 |
| JP | 07237428 | A | | 9/1995 |
| JP | 2002331326 | A | | 11/2002 |
| JP | 2003118346 | A | * | 4/2003 |
| JP | 2003266138 | A | | 9/2003 |
| JP | 2008143313 | A | | 6/2008 |
| JP | 2010064114 | A | | 3/2010 |
| JP | 5271459 | B1 | | 8/2013 |

OTHER PUBLICATIONS

Qijin, "Punching Process and Die Design (2nd Version)", China Machine Press, Jan. 2014, pp. 195-196.
International Search Report (ISR) dated Nov. 8, 2016 issued in International Application No. PCT/JP2016/079860.
Written Opinion dated Nov. 8, 2016 issued in International Application No. PCT/JP2016/079860.
Partial Supplementary European Search Report dated May 14, 2019 issued in European Application No. 16857310.3.
Japanese Office Action dated Jan. 15, 2019 (and English translation thereof) issued in Japanese Application No. 2017-546496.

* cited by examiner

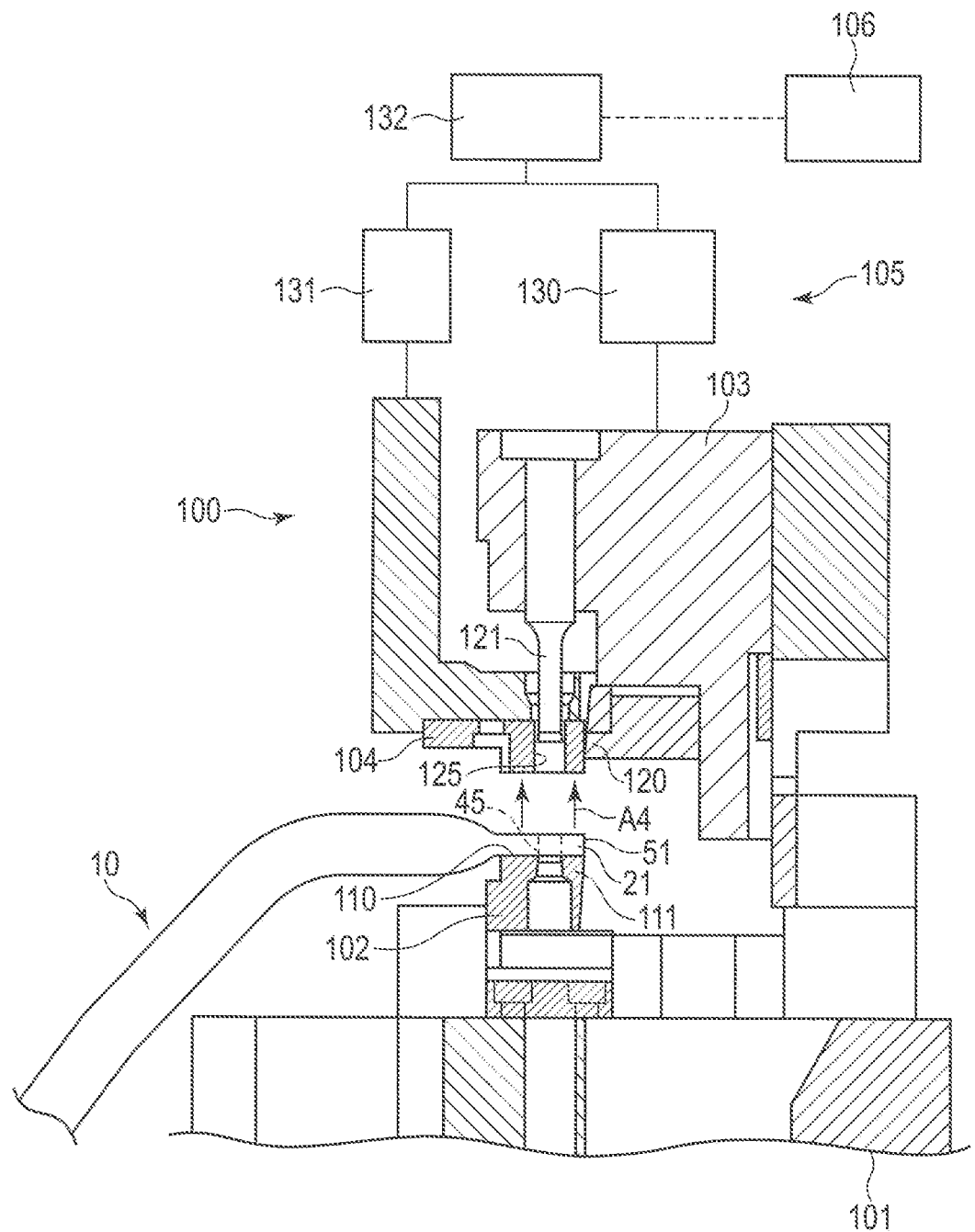
F I G. 10

VEHICLE STABILIZER, PROCESSING DEVICE FOR EYE PORTION OF STABILIZER, AND PROCESSING METHOD FOR EYE PORTION

CROSS-REFERENCE TO RELATED APPLICATIONS

This application as a Continuation Application of PCT Application No, PCT/JP2016/079860, filed Oct. 6, 2016 and based upon and claiming the benefit of priority from prior Japanese Patent Application No. 2015-206589, filed Oct. 20, 2015, the entire contents of all of which are incorporated herein by reference.

BACKGROUND OF THE INVENTION

1. Field of the Invention

The present invention relates to a vehicle stabilizer arranged in a suspension mechanism part of a vehicle such as a car, a processing device for an eye portion of the stabilizer, and a method for processing the eye portion.

2. Description of the Related Art

A stabilizer arranged in a suspension mechanism part of a vehicle, which is formed of a steel pipe or a solid rod-shaped steel material, includes a torsion portion (a twisted portion) which extends in a width direction of the vehicle, and a pair of arm portions (arms) connected via bent portions on both ends of the torsion portion. On a distal end of each of the arm portions, an eye portion is formed. In an example of the suspension mechanism part, the torsion portion of the stabilizer is supported by a vehicle body via a support portion including a rubber bushing. Further, the eye portion as connected to a suspension arm, etc., via a connecting member such as a stabilizer link. With respect to the stabilizer fitted in the suspension mechanism part, as the arm portion, the bent portion, and the torsion portion function as a spring in reaction to a rolling behavior of the vehicle body, roll stiffness of the vehicle can be enhanced.

In the stabilizer described in Patent Literature 1 (JP H07-237428 A) or Patent Literature 2 (JP 2002-331326 A), for example, a pair of eye portions is formed by flattening both ends of the steel pipe by upsetting. On each of the eye portions, a flat fastening surface is formed. In each of the fastening surfaces, a through-hole is formed. A connecting member such as a stabilizer link is inserted into the through-hole. The eye portion is connected to a suspension mechanism member such as a suspension arm through the connecting member.

When the eye portion of the stabilizer is to be formed by plastic working such as upsetting, there is a limit to accurately control the shape of the eye portion by the plastic working alone. For example, it is difficult to accurately control, for example, the positional relationship between a distal end surface and a through-hole of the eye portion, and the flatness and the degree of parallelization of the fastening surface by the plastic working alone. Moreover, it is inevitable that a shear droop (shear creep) caused by shearing will be formed at the distal end surface or a rim of the through-hole of the eye portion.

Accordingly, in order to increase the precision of the eye portion, finish processing such as machining is required, which means that work is increased and the cost thereby increased.

On the fastening surface of the eye portion, a connecting member such as a stabilizer link is fixed by a screw member such as a nut. For example, in order to make a surface pressuring force to be applied to the fastening surface even, it is desired to accurately manage the flatness and the degree of parallelization of the fastening surface. Because of the processing limit, etc., at the time of forming, obtaining a high-precision fastening surface was difficult in the eye portion of a conventional stabilizer. Depending on the specifications of a suspension mechanism, a stabilizer in which a distance from a distal end of the eye portion to the through-hole is short (i.e., a length of the eye portion is small) may be desired. In the eye portion as described above, it is difficult to accurately manage the distance from the distal end of the eye portion to the through-hole, and the flatness and the degree of parallelization of the fastening surface, for example, and a predetermined fastening surface was sometimes not obtained.

BRIEF SUMMARY OF THE INVENTION

Accordingly, an object of the present invention is to provide a vehicle stabilizer comprising an eye portion with a high-precision fastening surface, a processing device for the eye portion, and a method for processing the eye portion.

An embodiment relates to a vehicle stabilizer, which is formed of a rod-shaped steel material (a steel pipe or a solid steel rod), comprising a torsion portion extending in a width direction of a vehicle, a pair of arm portions connected via bent portions from both ends of the torsion portion, and a pair of eye portions. Each of the eye portions includes a first flat surface and a second flat surface that are parallel to each other, a trim portion which is located at a distal end of the eye portion, and includes a distal end surface at right angle to the first flat surface and the second flat surface, a through-hole which includes an inner surface at right angle to the first flat surface and the second flat surface, and is open on the first flat surface and the second flat surface, a flat annular reference surface which is a part of the first flat surface, and is formed around an opening of the through-hole, a distal-end-side curved portion, and a hole-side curved portion. The distal-end-side curved portion is formed at a first corner portion where the first flat surface intersects the distal end surface, on an outer side of the annular reference surface, and the thickness of the distal-end-side curved portion is reduced in a range of a first length from the first flat surface toward the distal end surface. The hole-side curved portion is formed at a second corner portion where the first flat surface intersects the inner surface of the through-hole all around the opening, on an inner side of the annular reference surface, the thickness of the hole-side curved portion is reduced in a range less than the first length from the first flat surface toward the inner surface, and the hole-side curved portion is curved with a curvature greater than that of the distal-end-side curved portion.

According to the embodiment, it is possible to prevent the distal-end-side curved portion formed when the trim portion is cut and the hole-side curved portion formed when the through-hole is punched from affecting the annular reference surface (fastening surface) which exists around the through-hole of the eye portion, and a vehicle stabilizer including a high-precision fastening surface can be provided.

In the present embodiment, a distance from an outer circumference of the annular reference surface to the distal end surface may be less than a distance from the outer circumference of the annular reference surface to the opening. Further, the hole-side curved portion may include a trim-side curved surface having a second length that is formed at a position near the trim portion, and a counter-trim-side curved surface having a third length that is formed on a side far from the trim portion, and the third length may be less than the second length. Further, in the present embodiment, a curvature of the counter-trim-side curved surface may be greater than a curvature of the trim-side curved surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a cross-sectional view showing the state in which the punch is elevated in the processing device.

DETAILED DESCRIPTION OF THE INVENTION

A stabilizer for a vehicle comprising an eye portion according to a first embodiment will be described with reference to FIGS. 1 to 4.

Figure 1:
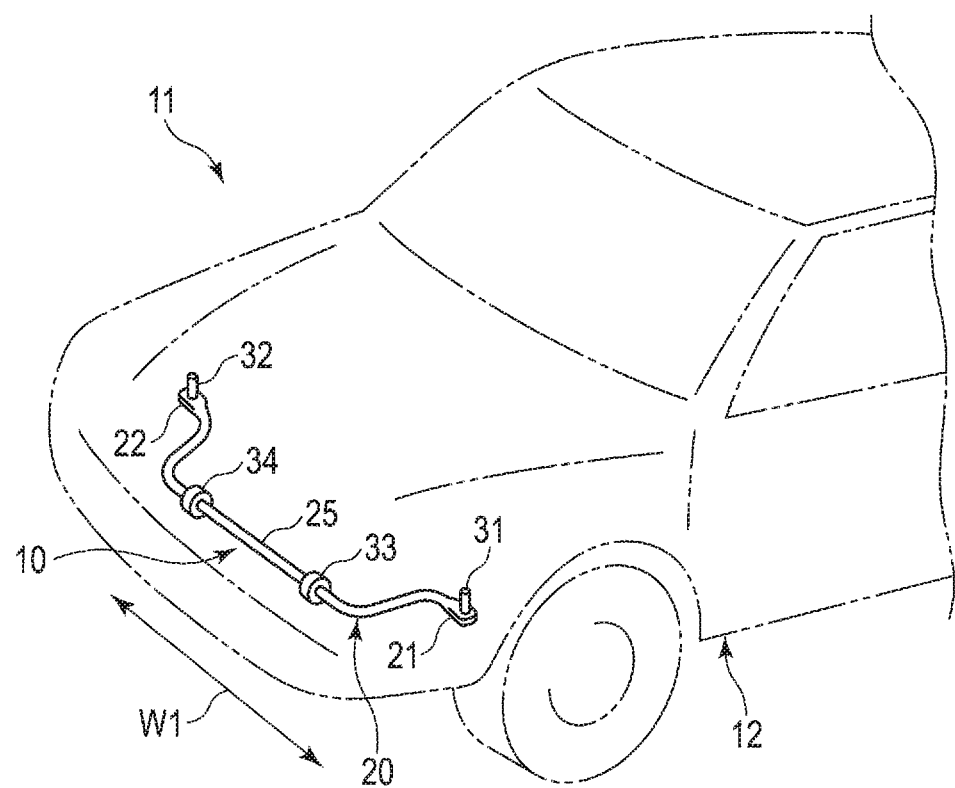
FIG. 1 is a perspective view showing a part of a vehicle and a stabilizer.
Figure 2:
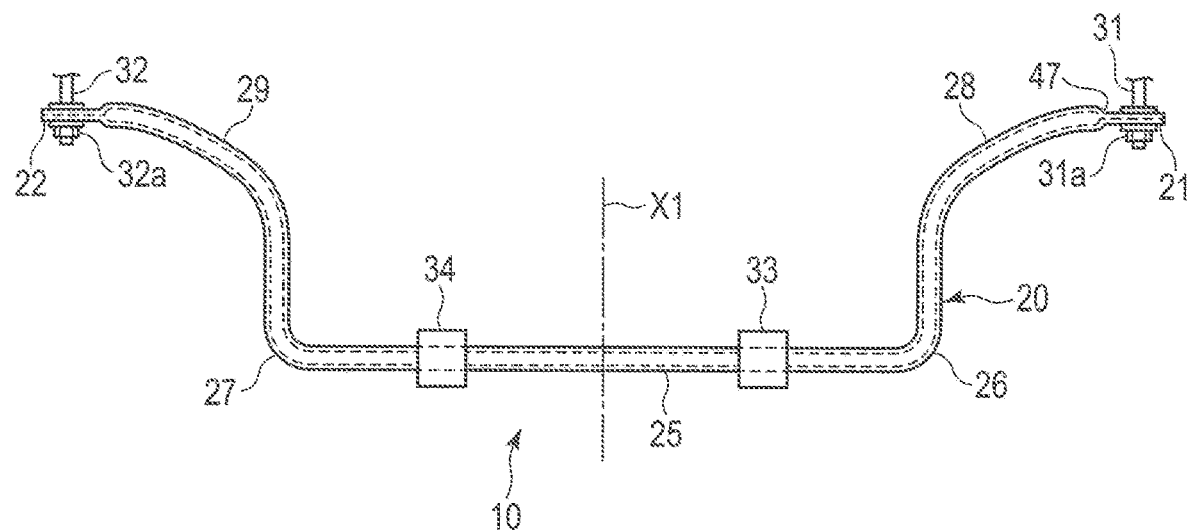
FIG. 2 is a plan view of a stabilizer according to a first embodiment.

FIG. 1 shows a part of a vehicle 11 comprising a vehicle stabilizer (which may hereinafter be simply referred to as a stabilizer) 10. The stabilizer 10 constitutes a part of a suspension mechanism part arranged at the lower part of a vehicle body 12 of the vehicle 11. FIG. 2 is a plan view showing an example of the stabilizer 10.

The stabilizer 10 is formed of a rod-shaped steel material (for example, a steel pipe), and includes a stabilizer body portion 20, and a pair of eye portions 21 and 22 formed integrally on both ends of the stabilizer body portion 20. In the stabilizer 10, each of the eye portions 21 and 22 is formed by pressing an end portion of the steel pipe to be flat by plastic working such as forging. Accordingly, the stabilizer 10 includes the stabilizer body portion 20, which is hollow, substantially keeping the shape of the steel pipe as it is, and the eye portions 21 and 22, which are solid, formed on both ends of the stabilizer body portion 20.

The stabilizer body portion 20 includes a torsion portion 25 extending in a width direction (i.e., a direction indicated by arrow W1 in FIG. 1) of the vehicle body 12, and a pair of arm portions 28 and 29. The arm portions 28 and 29 are continuous through their corresponding bent portions 26 and 27 from the both ends of the torsion portion 25, respectively.

The shape of the stabilizer 10 is not limited to planar. For example, the stabilizer 10 may include one or more bending portions in the torsion portion 25, or one or more bending portions in the arm portions 28 and 29, including a three-dimensional bent configuration. Further, the bent portions 26 and 27 may have a three-dimensional bent configuration, for example, and embody various bent configurations according to the type of the vehicle 11. On a surface of the stabilizer 10, coating for preventing rust of the steel material is applied.

The stabilizer 10 is bisymmetrical about a symmetric axis X1 (FIG. 2), and includes the eye portions 21 and 22 on the both ends. The eye portions 21 and 22 are connected to suspension arms, etc., of the suspension mechanism part through rod-shaped connecting members 31 and 32 such as stabilizer links, respectively.

The torsion portion 25 is supported by a part of the vehicle body 12 (for example, a cross-member), for example, via a pair of support portions 33 and 34 comprising a rubber bushing, etc. When forces having opposite phases are input to the arm portions 28 and 29, such as when the vehicle 11 drives on a curve, a bending force is exerted on the arm portions 28 and 29, and bending and torsional force is exerted on the bent portions 26 and 27. As a result, because the torsion portion 25 is twisted and a repulsive load is produced, a rolling behavior of the vehicle body 12 is suppressed.

A material of the stabilizer 10 of the present embodiment is a steel pipe, and the stabilizer body portion 20 is formed into a predetermined shape by a bending machine or the like. An example of the steel material is a steel pipe made of a type of steel capable of improving its strength by a heat treatment such as quenching, more specifically, using ASB25N or the like as the material. By flattening both ends of the steel material by plastic working such as forging, the eye portions 21 and 22 are formed. Note that in a case of a solid stabilizer, a solid steel rod is used as the material.

Since the eye portions 21 and 22 are bilaterally symmetric with respect to the symmetric axis X1 (FIG. 2), one of the eye portions, i.e., the eye portion 21 (FIGS. 3 and 4), will be hereinafter described as a typical example of the eye portions. The other eye portion 22 is structured to be substantially similar to the eye portion 21.

Figure 3:
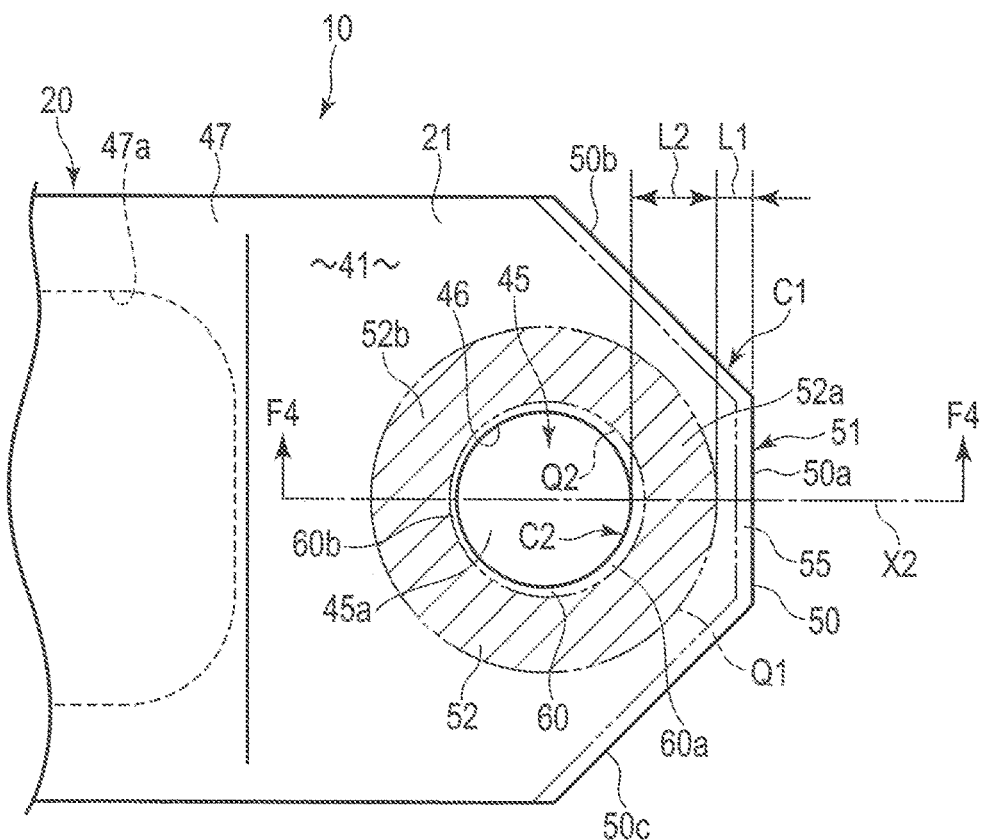
FIG. 3 is a plan view of an eye portion of the stabilizer shown in FIG. 2, in which an annular reference surface is shown by hatching.
Figure 4:
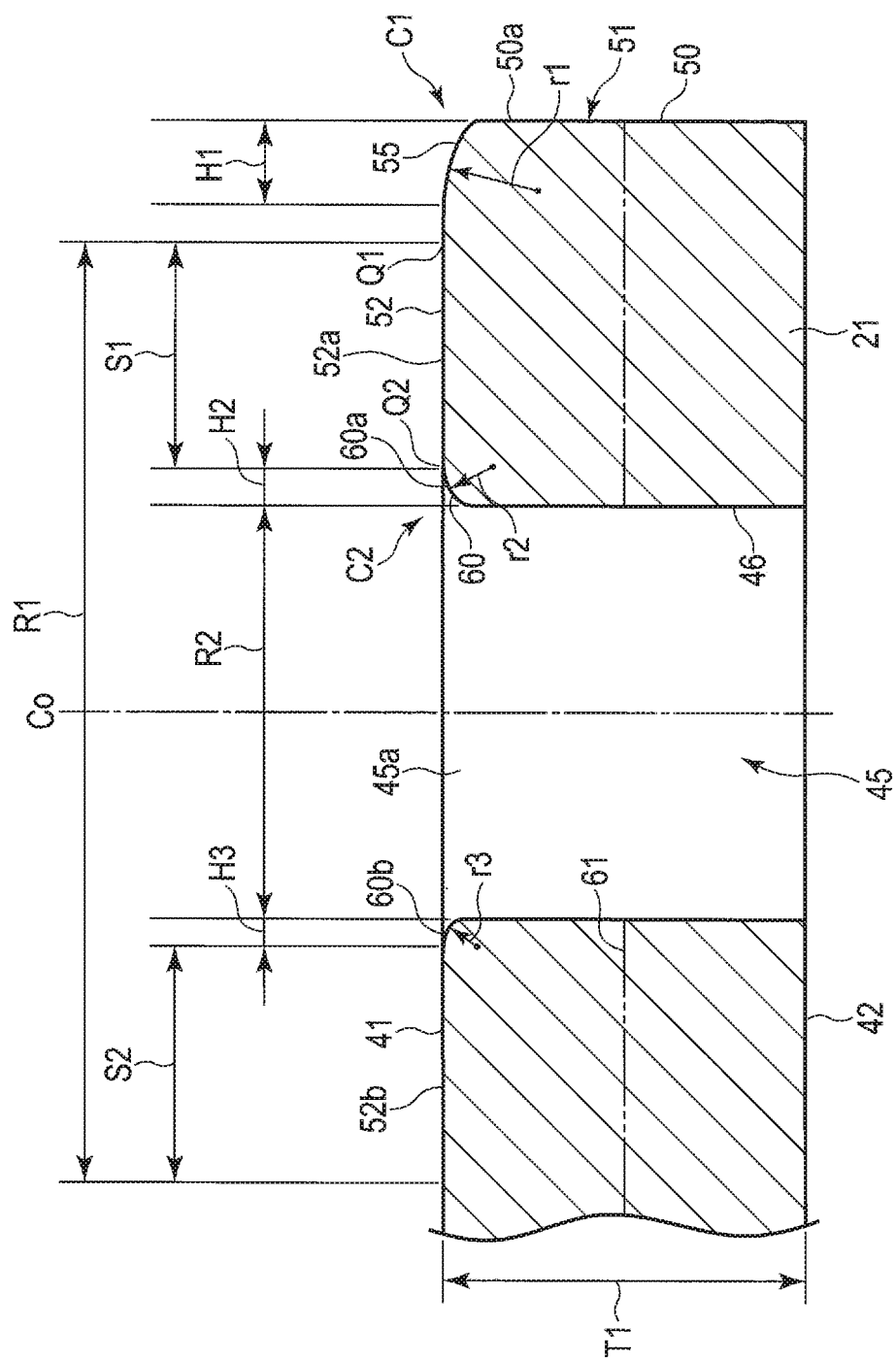
FIG. 4 is a cross-sectional view of the eye portion taken along line F4-F4 of FIG. 3.

FIG. 3 is a plan view of the eye portion 21, and FIG. 4 is a cross-sectional view of the eye portion 21. As shown in FIG. 4, the eye portion 21 includes a first flat surface 41 and a second flat surface 42 that are parallel to each other formed by plastic working such as forging. The second flat surface 42 is located on a side opposite to the first flat surface 41. Further, the eye portion 21 has a circular through-hole 45. The through-hole 45 can be formed by a processing device 100 (FIGS. 6 to 10) which will be described later. An inner surface (an inner peripheral surface) 46 of the through-hole 45 is orthogonal to the first flat surface 41 and the second flat surface 42.

The through-hole 45 penetrates the eye portion 21 in a thickness direction, and is open on both of the first flat surface 41 and the second flat surface 42. A proximal portion of the connecting member 31 (FIGS. 1 and 2) such as the stabilizer link is inserted into the through-hole 45. The connecting member 31 is fixed to the eye portion 21 by a fixing screw member 31a such as a nut. The other eye portion 22 is structured similarly, and the connecting member 32 is fixed to the eye portion 22 by a fixing screw member 32a.

With respect to the stabilizer 10 of the present embodiment, the eye portion 21 is formed by flattening the end portion of the steel pipe. Consequently, a tapered portion 47 is formed between the arm portion 28 which is hollow and the eye portion 21 which is solid. The tapered portion 47 has such a shape that the thickness is gradually reduced from the arm portion 28 toward the eye portion 21, and includes a hollow portion 47a inside.

The eye portion 21 includes a trim portion 51 formed at a distal end of the eye portion 21, an annular reference surface 52 which is circular and flat (shown by hatching in FIG. 3), a distal-end-side curved portion 55, and a hole-side curved portion 60. The trim portion 51 includes a distal end surface 50 cut by the processing device 100 (FIGS. 6 to 10). The annular reference surface 52 is a part of the first flat surface 41, and is formed concentrically with an opening 45a around the through-hole 45. The distal-end-side curved portion 55 is formed on an edge of the trim portion 51. The hole-side curved portion 60 is formed on a rim of the opening 45a.

The trim portion 51 is formed at a distal end of the eye portion 21. The distal-end-side curved portion 55 is formed between the trim portion 51 and the annular reference surface 52. As shown in FIG. 4, in a cross section of the eye portion 21 in a thickness direction, the distal end surface 50 of the eye portion 21 is orthogonal to the first flat surface 41 and the second flat surface 42. Although a thickness T1 of the eye portion 21 is, for example, 7 to 12 mm, the thickness T1 may take on a different value depending on the type of a car.

The flat annular reference surface 52 serves as a fastening surface to which the fixing connecting member 31 such as the stabilizer link is fixed. The annular reference surface 52 has a circular shape in which a center $C_0$ (FIG. 4) of the through-hole 45 is set as the center. An outside diameter R1 of the annular reference surface 52 is greater than an inside diameter R2 of the through-hole 45. The annular reference surface 52 includes a trim-side flat portion 52a, which is located on a side close to the trim portion 51, and a counter-trim-side flat portion. 52b, which is located on a side far from the trim portion 51.

By flattening the end portion of the steel pipe by forging, etc., the eye portion 21 is formed. Accordingly, a pressure contacting portion 61 (shown by a two-dot chain line in FIG. 4) of the steel pipe inner surface exists at substantially the center of the eye portion 21 in the thickness direction. As the end portion of the steel pipe is flattened, the tapered portion 47 is formed between the arm portion 26 and the eye portion 21. There is a processing limit on the precision of the tapered portion 47, and it is inevitable that the shapes of the tapered portions 47 will be varied to some degree. Accordingly, when the annular reference surface 52 is formed near the tapered portion 47, it is possible that the flatness of the counter-trim-side flat portion 52b will be affected within a tolerance range.

As shown in FIG. 3, a distance L1 from an outer circumference Q1 of the annular reference surface 52 to the distal end surface 50 is less than a distance L2 from the outer circumference Q1 of the annular reference surface 52 to the opening 45a. More specifically, with respect to the eye portion 21 of the present embodiment, a length of the eye portion 21 in a direction of an axis X2 is less than that of a conventional general eye portion. Moreover, the distal end surface 50 of the eye portion 21 includes a cut surface 50a which is orthogonal to the axis X2, and cut surfaces 50b and 50c that are cut obliquely with respect to the axis X2. The above is due to a spatial restriction in a stabilizer mounting portion of a suspension.

The distal-end-side curved portion 55 existing at the trim portion 51 is formed at a first corner portion C1 where the first flat surface 41 intersects the distal end surface 50 outside the outer circumference Q1 (FIG. 3) of the annular reference surface 52. In other words, the distal-end-side curved portion 55 is formed between the outer circumference C1 of the annular reference surface 52 and the distal end surface 50. The thickness of the distal-end-side curved portion 55 is reduced in a range of a first length H1 (FIG. 4), from the first flat surface 41 toward the end surface 50. The first length H1 varies depending on conditions such as the temperature of the eye portion 21 and the thickness T1 of the eye portion 21 when the trim portion 51 is cut. For example, the first length H1 is in a range of 2.0 to 3.5 mm.

The greater the thickness T1 of the eye portion 21 is, the greater the length (the first length H1) of the distal-end-side curved portion 55 tends to be. As compared to a conventional general eye portion, in the eye portion 21 of the present embodiment, a distance between the trim portion 51 and the annular reference surface 52 is considerably short. In other words, the distance L1 from the outer circumference Q1 of the annular reference surface 52 to the distal end surface 50 is less than the distance L2 from the outer circumference Q1 of the annular reference surface 52 to the opening 45a (L1<L2).

As a result of intensive study of the inventors of the present invention, it has been found that the length of the distal-end-side curved portion 55 and the length of the hole-side curved. portion 60 can be made much less than those of the conventional eye portion by processing the eye portion 21 using the processing device 100 shown in FIGS. 6 to 10. Moreover, by using the processing device 100, the annular reference surface 52 of the intended flatness can be obtained.

The hole-side curved portion 60 existing at the rim of the through-hole 45 is formed at a second corner C2 where the first flat surface, 41 intersects an inner surface 46 of the through-hole 45. In other words, the hole-side curved portion 60 is formed on the entire periphery of a rim portion where the first flat surface 41 intersects the inner surface 46 (i.e., the opening 45a of the through-hole 45), inside an inner circumference Q2 of the annular reference surface 52.

As schematically illustrated in FIG. 4, the hole-side curved portion 60 includes a trim-side curved surface 60a, which is located on a side close to the trim portion 51, and a counter-trim-side curved surface 60b, which is located on a side far from the trim portion 51. The trim-side curved surface 60a is formed in a range of a second length H2 from the first flat surface 41 toward the inner surface 46. The second length H2 is less than the length (the first length H1) of the distal-end-side curved portion 55.

The counter-trim-side curved surface 60b is formed in a range of a third length H3 from the first flat surface 41 toward the inner surface 46. The third length H3 is less than the second length H2. For example, while the first length H1 is 3 mm, the second length H2 is, for example, 0.6 mm, and the third length H3 is, for example, 0.4 mm. With respect to a curved surface in a range between the trim-side curved surface 60a and the counter-trim-side curved surface 60b, the length is gradually reduced from the second length H2 to the third length H3.

That is, the thickness of the trim-side curved surface 60a of the hole-side curved portion 60 is reduced in a range of the second length H2 (FIG. 4), from the first flat surface 41 toward the inner surface 46. Also, the thickness of the counter-trim-side curved surface 60b is reduced in a range of the third length H3, from the first flat surface 41 toward the inner surface 46.

As shown in FIG. 4, the hole-side curved portion 60 is curved with a greater curvature than that of the distal-end-side curved portion 55 from the inner circumference Q2 of the annular reference surface 52 toward the inner surface 46 of the through-hole 45. More specifically, a radius of curvature r2 of the trim-side curved surface 60a is less than a radius of curvature r1 of the distal-end-side curved portion 55. Moreover, the counter-trim-side curved surface 60b is curved with a greater curvature than that of the trim-side curved surface 60a, In other words, a radius of curvature r3 of the counter-trim-side curved surface 60b is less than the radius of curvature r2 of the trim-side curved surface 60a. An area between the trim-side curved surface 60a and the counter-trim-side curved surface 60b is shaped such that the radius of curvature is gradually reduced from the radius of curvature r2 to the radius of curvature r3.

As described above, the eye portion 21 of the present embodiment includes the distal-end-side curved portion 55 having the first length H1 outside the outer circumference Q1 of the annular reference surface 52.

The distal-end-side curved portion 55 is formed at the first corner portion C1 where the first flat surface 41 intersects the distal end surface 50. Also, the eye portion 21 includes the hole-side curved portion 60 inside the inner circumference Q2 of the annular reference surface 52. The hole-side curved portion 60 is formed at the second corner portion C2 where the first flat surface 41 intersects the inner surface 46.

The hole-side curved portion 60 includes the trim-side curved surface 60a and the counter-trim-side curved surface 60b. The length (the second length H2) of the trim-side curved surface 60a is less than the length (the first length H1) of the distal-end-side curved portion 55, and is greater than the length (the third length H3) of the counter-trim-side curved surface 60b (H1>H2>H3). In other words, the length of the hole-side curved portion 60 is less than the length of the distal-end-side curved portion 55. The length of the hole-side curved portion 60 is less than or equal to the second length H2, and is greater than or equal to the third length H3. The radius of curvature r2 of the trim-side curved surface 60a is less than the radius of curvature r1 of the distal-end-side curved portion 55, and is greater than the radius of curvature r3 of the counter-trim-side curved surface 60b (r1>r2>r3). In other words, the hole-side curved portion 60 is curved with a greater curvature than that of the distal-end-side curved portion 55. Moreover, the distal-end-side curved portion 55 is formed outside the outer circumference Q1 of the annular reference surface 52, and the hole-side curved portion 60 is formed inside the inner circumference Q2 of the annular reference surface 52.

By forming the eye portion 21 in the above shape, it is possible to control the flatness of the annular reference surface 52 from being affected by the distal-end-side curved portion 55 and the hole-side curved portion 60, and the flatness of the annular reference surface 52 can be kept within a tolerance range. In particular, even with an eye portion 21 in which a distance from the annular reference surface 52 to the trim portion 51 is short (i.e., the eye portion in which L1 of FIG. 3 is smaller than L2), the annular reference surface 52 of a desired area and flatness could be secured. L1 is a distance from the outer circumference Q1 of the annular reference surface 52 to the distal end surface 50. L2 is a distance from the outer circumference Q1 of the annular reference surface 52 to the opening 45a. The other eye portion 22 has a similar annular reference surface.

The flatness of the annular reference surface 52 is within a tolerance range. However, microscopically, some irregularities and inclinations exist on the annular reference surface 52. At a circumferential portion of the annular reference surface 52 near the tapered portion 47, the counter-trim-side flat portion 52b is formed. Although the eye portion 21 is formed into a flat shape by a load applied during the processing, when the load is released after the processing, the tapered portion 47 has the nature of slightly restoring its shape to the original state. Accordingly, the flatness of the counter-trim-side flat portion 52b, in particular, may be affected although the flatness in question is within the tolerance range. That is, the counter-trim-side flat portion 52b is likely to be affected by the tapered portion 47 as compared to the trim-side flat portion 52a.

As described above, the hole-side curved portion 60 includes the trim-side curved surface 60a and the counter-trim-side curved surface 60b. The counter-trim-side curved surface 60b is curved with a greater curvature (a smaller radius of curvature) than that of the trim-side curved surface 60a. Moreover, the length H3 of the counter-trim-side curved surface 60b is less than the length H2 of the trim-side curved surface 60a. Accordingly, a width 52 (FIG. 4) of the counter-trim-side flat portion 52b is slightly greater than a width S1 of the trim-side flat portion 52a.

In other words, the annular reference surface 52 is slightly widened from the trim-side flat portion 52a having the width S1 toward the counter-trim-side flat portion 52h having the width 52. Accordingly, an area on the side at the counter-trim-side flat portion 52b can be made slightly larger than an area on the side at the trim-side flat portion 52a. By this feature, small shape variations of the counter-trim-side flat portion 52b are moderated, and a surface pressuring force that the annular reference surface 52 receives as the fastening surface can further be equalized.

Figure 5:
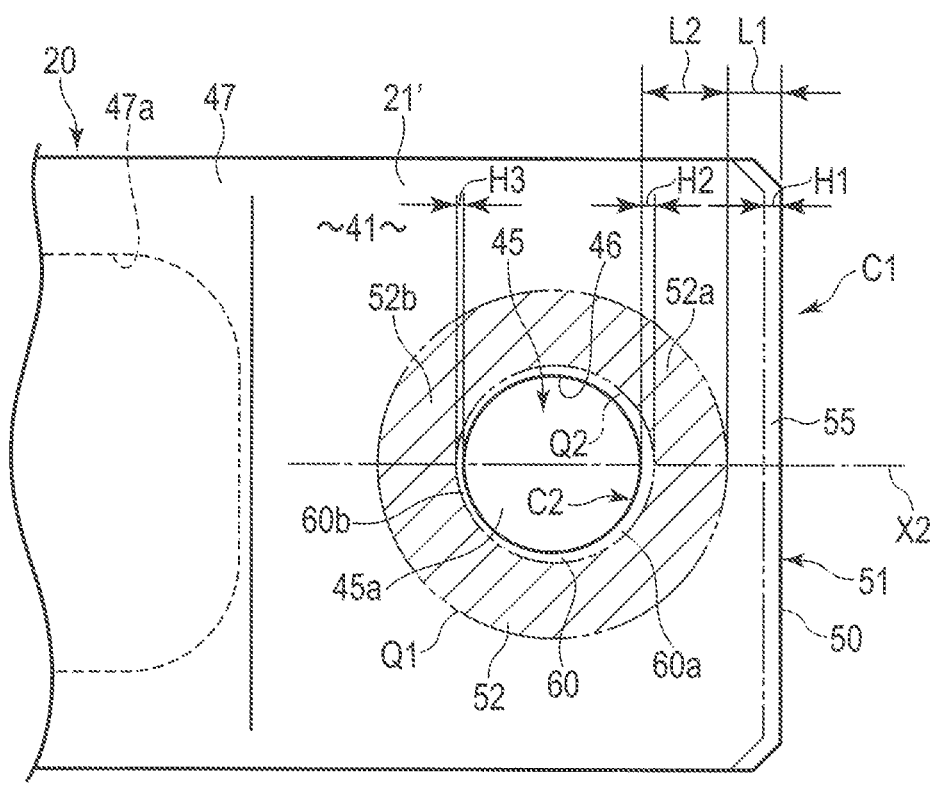
FIG. 5 is a plan view of an eye portion of a stabilizer according to a second embodiment, in which an annular reference surface is shown by hatching.

FIG. 5 schematically shows an eye portion 21' according to a second embodiment. Likewise the eye portion 21 of the first embodiment, the eye portion 21' comprises a through-hole 45, a trim portion 51, an annular reference surface 52, a distal-end-side curved portion 55, and a hole-side curved portion 60. The annular reference surface 52 is formed concentrically with an opening 45a of the through-hole 45 around the opening 45a. The distal-end-side curved portion 55 is formed at a first corner portion C1 where a first flat surface 41 intersects a distal end surface 50, outside an outer circumference Q1 of the annular reference surface 52. H1 in FIG. 5 represents a length (a first length) of the distal-end-side curved portion 55. The hole-side curved portion 60 is formed at a second corner portion C2 where the first flat surface 41 intersects an inner surface 46, inside an inner circumference Q2 of the annular reference surface 52.

The hole-side curved portion 60 includes a trim-side curved surface 60a, which is close to the trim portion 51, and a counter-trim-side curved surface 60b, which is on a side far from the trim portion 51. H2 in FIG. 5 represents a length (a second length) of the trim-side curved surface 60a. H3 represents a length (a third length) of the counter-trim-side curved surface 60b. The second length H2 is less than the first length H1. The third length H3 is less than the second length H2. As in the first embodiment, the hole-side curved portion 60 is curved with a greater curvature (a smaller radius of curvature) than that of the distal-end-side curved portion 55. The counter-trim-side curved surface 60b is curved with a greater curvature (a smaller radius of curvature) than that of the trim-side curved surface 60a.

L1 in FIG. 5 represents a distance from the outer circumference Q1 of the annular reference surface 52 to the distal end surface 50. L2 represents a distance from the outer circumference Q1 of the annular reference surface 52 to the opening 45a. Likewise the eye portion 21 of the first embodiment, in the eye portion 21', L1 is smaller than L2.

Next, referring to FIGS. 6 to 10, the processing device 100 of the eye portion will be described. FIGS. 6 to 10 show the action of the processing device 100 when the eye portion is processed in the order of steps. Note that while FIGS. 6 to 10 show a case of processing one of the eye portions, i.e., the eye portion 21, the other eye portion 22 is processed similarly. Accordingly, a case of processing the eye portion 21 will be hereinafter explained as a typical example of the processing.

The processing device 100 comprises a base (base member) 101, a lower die 102, an upper die 103, a hydraulic drive stripper 104, a hydraulic unit 105, and a controller 106. The base 101 is fixed on a floor, etc., of a factory. The lower die 102 is arranged on the base 101. Each of the upper die 103 and the hydraulic drive stripper 104 is disposed above the lower die 102. The lower die 102 is provided with a workpiece support portion 110 on which the eye portion 21 is mounted, and a lower blade 111.

The upper die 103 is provided with an upper blade 120 and a punch 121. The upper blade 120 and the lower blade 111 form a pair. The eye portion 21 is pressed between the workpiece support portion 110 and the hydraulic drive stripper 104. As the upper blade 120 is lowered toward the lower die 102 from a first position (FIG. 6) to a second position (FIG. 8), the trim portion 51 of the eye portion 21 is cut.

The punch 121 can be moved up and down together with the upper blade 120 between the first position and the second position. When the upper die 103 is lowered toward the lower die 102 to the second position, simultaneously with the cutting of the trim portion 51 by the lower blade 111 and the upper blade 120, the through-hole 45 is formed in the eye portion 21 by the punch 121. Accordingly, variations in the positional relationship between the through-hole 45 and the trim portion 51 do not occur, and the through-hole 45 and the trim portion 51 can be formed with high precision.

Figure 7:
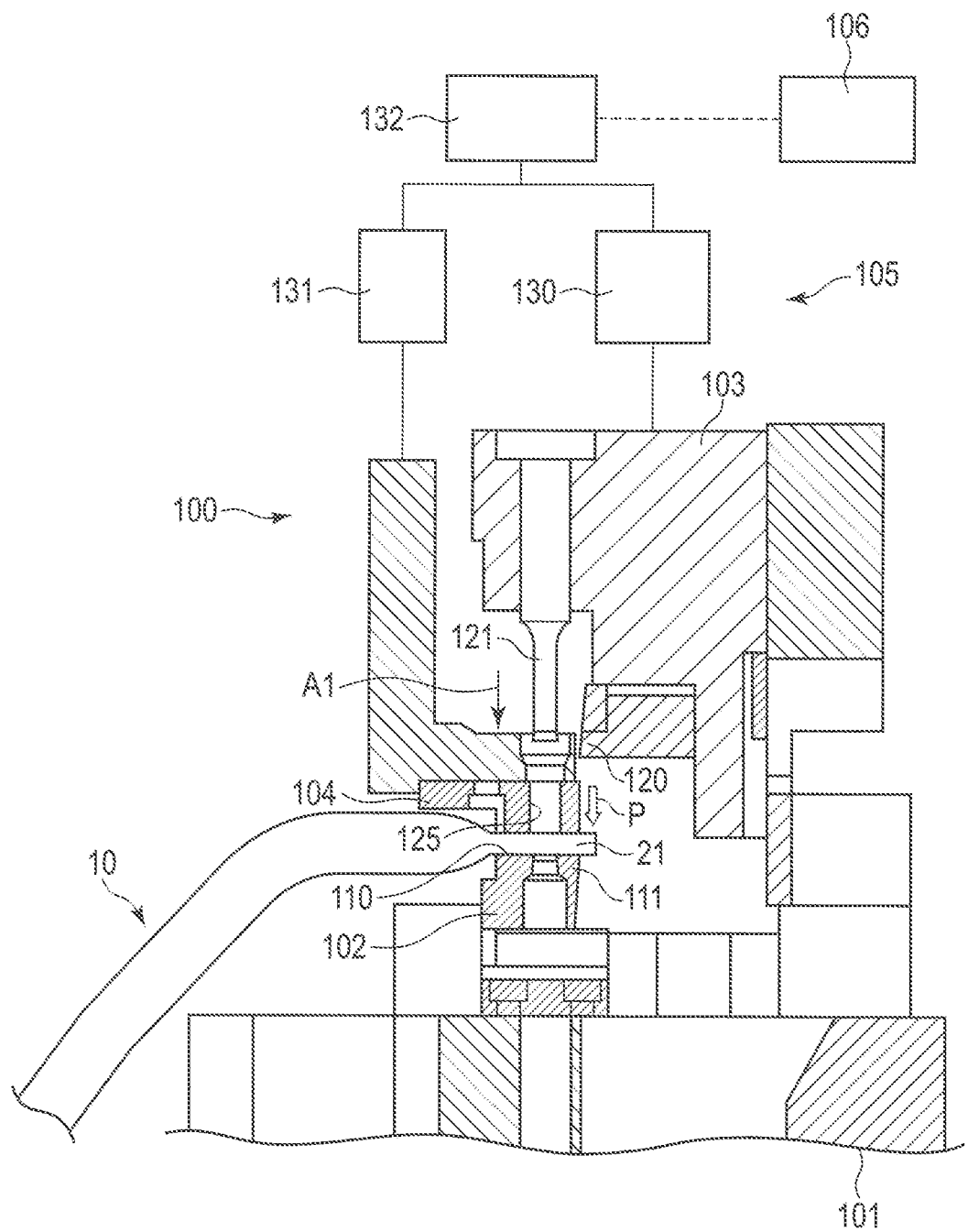
FIG. 7 is a cross-sectional view showing the state in which a hydraulic drive stripper is lowered in the processing device.
Figure 9:
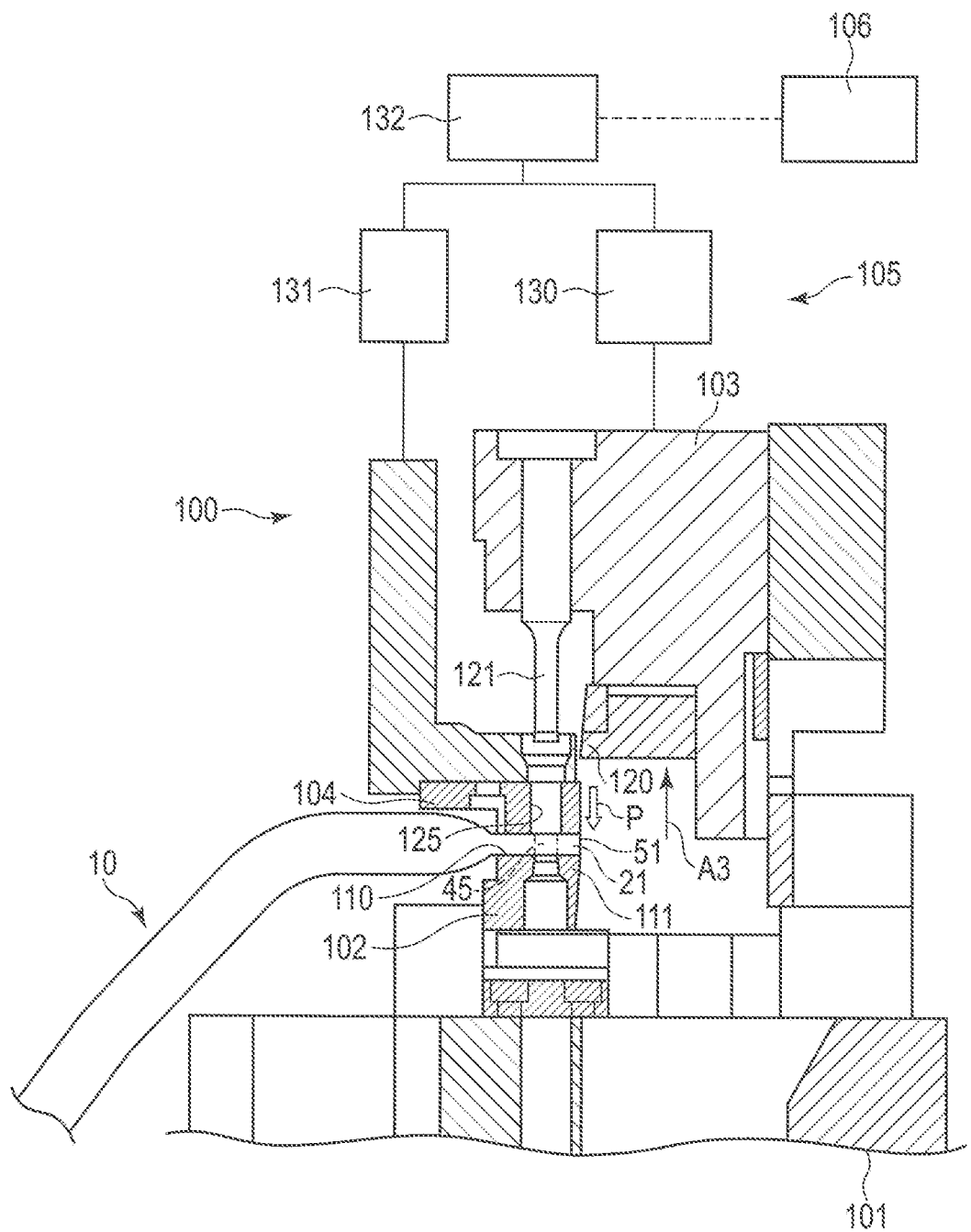
FIG. 9 is a cross-sectional view showing the state in which the upper die is elevated in the processing device.

The hydraulic drive stripper 104 functions as a retaining member for retaining the eye portion 21. In the hydraulic drive stripper 104, a vertical hole 125 into which the punch 121 is inserted is formed. The hydraulic drive stripper 104 moves vertically by an actuator 131. In a state in which the upper die 103 is lowered to the second position, the hydraulic drive stripper 104 presses the eye portion 21 with a predetermined fluid pressure P (FIGS. 7 and 9). In this way, the eye portion 21 is pressed between the hydraulic drive stripper 104 and the workpiece support portion 110 in a thickness direction. Although an example of the fluid pressure to be provided to the actuator 131 is 20 MPa (5 to 35 MPa), the fluid pressure may take on a value other than the above value.

The hydraulic unit 105 includes a first actuator 130 such as a hydraulic cylinder, a second actuator 131 such as a hydraulic cylinder, a hydraulic supply source 132, etc. The first actuator 130 moves the upper die 103 vertically. The second actuator 131 moves the hydraulic drive stripper 104 vertically. The hydraulic supply source 132 comprises a hydraulic pump which provides a fluid pressure to the actuators 130 and 131, a distribution valve, and the like. The hydraulic supply source 132 is controlled by a predetermined sequence by the controller 106 in which an electric control program and control data are stored.

The controller 106 controls the actuator 130 such that the upper die 103 moves between the first position and the second position. For example, by moving the upper die 103 from the first position toward the second position, the trim portion 51 is cut between the lower blade 111 and the upper blade 120, and the through-hole 45 is punched by the punch 121.

While the upper die 103 moves from the first position toward the second position, the controller 106 controls the actuator 131 such that the hydraulic drive stripper 104 is pressed against the eye portion 21 with a constant fluid pressure P. Moreover, while the upper die 103 is elevated and returns to the first position from the second position, the controller 106 controls the actuator 131 to maintain the fluid pressure P of the hydraulic drive stripper 104. Accordingly, while the upper die 103 is moved from the second position to the first position, pressurization of the eye portion 21 with the fluid pressure P continues. The controller 106 has the function of releasing the fluid pressure which has been applied to press the eye portion 21 continuously, and also retracting the hydraulic drive stripper 104 above the eye portion 21 in a state in which the upper die 103 is returned to the first position.

With respect to a method of processing the eye portion according to the present embodiment, the eye portion 21 is processed through the steps described below. Since the other eye portion 22 is processed similarly, a case of processing the eye portion 21 will be explained below.

Figure 6:
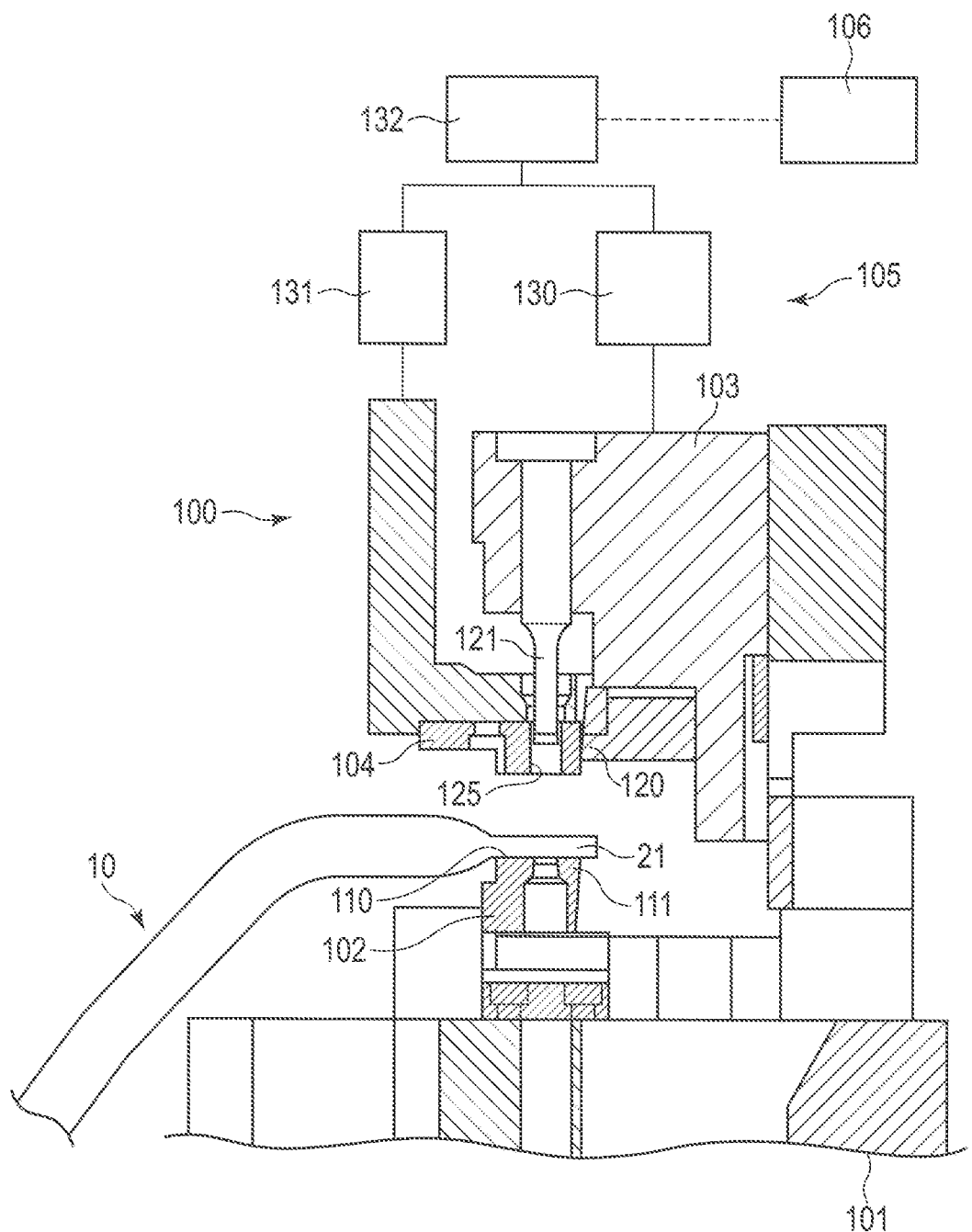
FIG. 6 is a cross-sectional view showing a part of a processing device for an eye portion and the state in which the eye portion is mounted on a lower die.

(1) As shown in FIG. 6, the eye portion 21 of the heated stabilizer 10 is placed on the workpiece support portion 110 of the lower die 102. The temperature of the heated stabilizer 10 is, for example, 850 to 1150° C.

(2) As shown in FIG. 7, the hydraulic drive stripper 104 is moved (lowered) in a direction shown by arrow A1 from above the eye portion 21. Further, by pressing the hydraulic drive stripper 104 toward the eye portion 21 with the fluid pressure P, the eye portion 21 is sandwiched between the hydraulic drive stripper 104 and the workpiece support portion 110 in a thickness direction.

Figure 8:
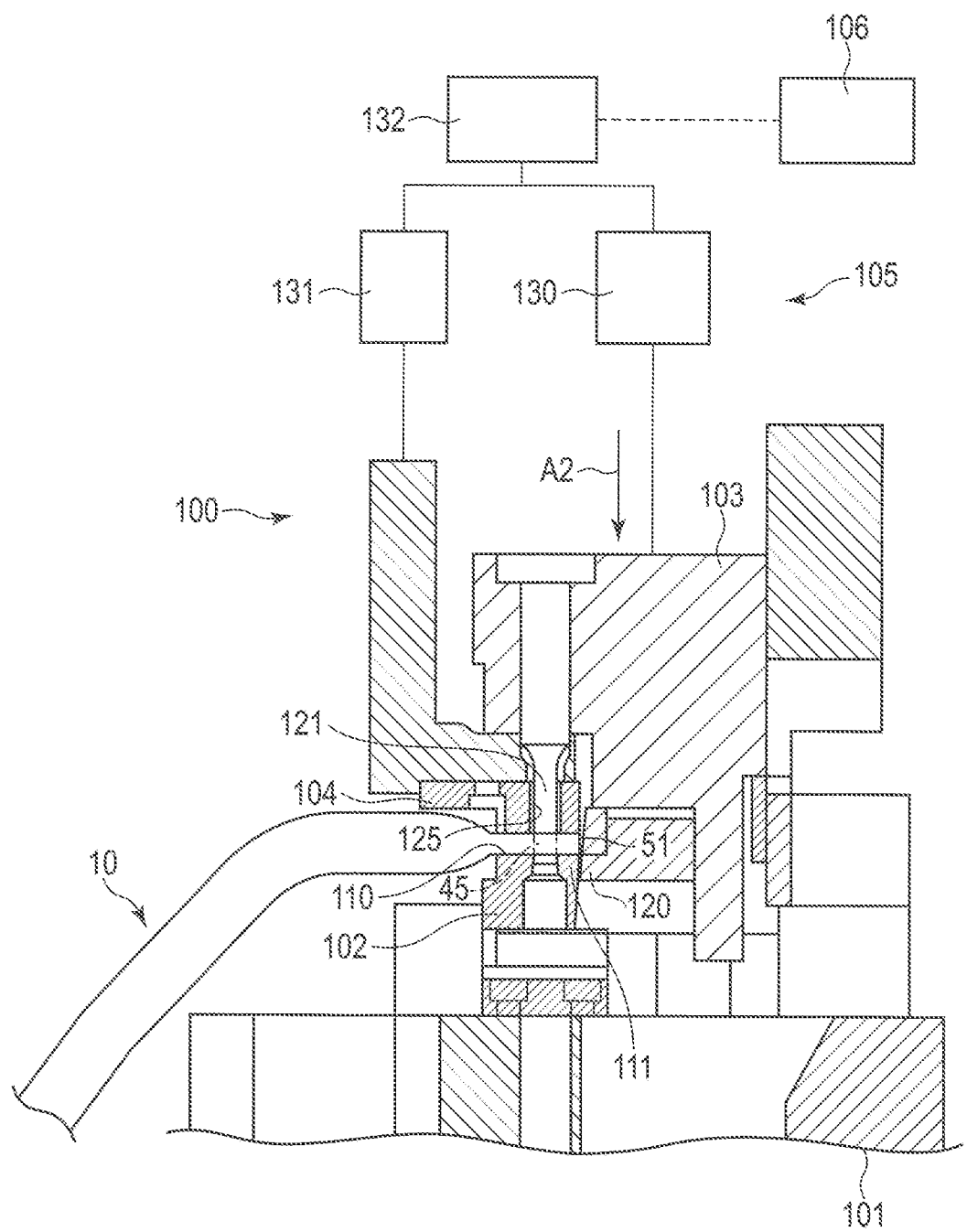
FIG. 8 is a cross-sectional view slowing the state in which an upper die and a punch are lowered in the processing device.

(3) As shown in FIG. 8, in a state in which the eye portion 21 is pressed by the hydraulic drive stripper 104, the upper die 103 is moved (lowered) toward the lower die 102 in a direction shown by arrow A2. By this operation, the upper blade 120 and the punch 121 are lowered simultaneously to cut the trim portion 51 between the lower blade 111 and the upper blade 120, and also to form the through-hole 45 by the punch 121. When the portion 51 is cut by the upper blade 120, the distal-end-side curved portion 55 is formed on a cut surface (near an upper edge of the trim portion 51) of the trim portion 51 in contact with the upper blade 120. Also, when the through-hole 45 is punched by the punch 121, the hole-side curved portion 60 is formed on a rim (around the opening 45a) of the inner surface of the through-hole 45 in contact with the punch 121.

(4) As shown in FIG. 9, after the through-hole 45 and the trim portion 51 have been formed, the upper die 103 is moved (elevated) in a direction indicated by arrow A3. While the upper die 103 is elevated to the first position, by maintaining the fluid pressure P to be provided to the hydraulic drive stripper 104, the eye portion 21 is continued to be pressed under the fluid pressure P.

(5) As shown in. FIG. 10, when the upper die 103 is elevated to the first position, the fluid pressure of the hydraulic drive stripper 104 which has been applied to press the eye portion 21 continuously is released. As the hydraulic drive stripper 104 is moved (elevated) in a direction indicated by arrow A4, the hydraulic drive stripper 104 is retracted from the eye portion 21.

As a result of intensive study of the inventors of the present invention, it has been found that the processing method of the present embodiment is effective in increasing the precision of the annular reference surface 52. More specifically, while the upper die 103 is elevated from the second position to the first position after the through-hole 45 and the trim portion 51 have been formed, the fluid pressure P to be provided to the hydraulic drive stripper 104 is maintained for a certain period of time, and the eye portion 21 is continued to be pressed under the fluid pressure P. By doing so, the length H1 (FIGS. 4 and 5) of the distal-end-side curved portion 55, and the lengths H2 and H3 of the hole-side curved portion 60 can be reduced, and the radius of curvature r1 of the distal-end-side curved portion 55 and the radii of curvature r2 and r3 of the hole-side curved portion 60 can also be reduced.

For comparison, a case of processing the eye portion using a conventional processing device (a comparative example) has also been tested. The processing device of the comparative example includes a movable stripper which presses the eye portion by a repulsive load of a coil spring. In this comparative example, the repulsive load of the coil spring is reduced as the movable stripper is elevated, and the repulsive load of the coil spring is completely lost in a short time. With respect to the distal-end-side curved portion and the hole-side curved portion of the eye portion which have been processed by the conventional processing device, the lengths were greater than those of the distal-end-side curved portion and the hole-side curved portion of the eye portion of the present embodiment, and the radii of curvature were also greater.

Note that when the trim portion 51 is sheared by the lower blade 111 and the upper blade 120, a burr may be created on the second flat surface 42 at the distal end surface 50. Also, when the through-hole 45 is punched by the punch 121, a burr may be created on the second flat surface 42 at the inner surface 46. These burrs are removed by performing finishing machining such as polishing or grinding of the second flat surface.

In carrying out the present invention, the steel material, which is a material of the stabilizer, may be a solid material other than a hollow material (a steel pipe). Further, needless to say, specific forms and arrangement or the like of the stabilizer body portion and eye portions can be modified variously according to the specifications of the suspension mechanism part of a vehicle when implementing the invention. The specific shapes of the annular reference surface (fastening surface), distal-end-side curved portion, and hole-side curved portion of the eye portion are not limited to those of the above embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle stabilizer including eye portions on both ends, each of the eye portions comprising:
   a first flat surface and a second flat surface that are parallel to each other;
   a trim portion which is located at a distal end of the eye portion, and includes a distal end surface at a right angle to the first flat surface and the second flat surface;
   a through-hole which includes an inner surface at a right angle to the first flat surface and the second flat surface, and is open on the first flat surface and the second flat surface;
   a flat annular reference surface which is a part of the first flat surface, and is formed around an opening of the through-hole;
   a distal-end-side curved portion which is formed at a first corner portion where the first flat surface intersects the distal end surface, on an outer side of the annular reference surface, a thickness of the distal-end-side curved portion being reduced in a range of a first length from the first flat surface toward the distal end surface; and
   a hole-side curved portion which is formed at a second corner portion where the first flat surface intersects the inner surface of the through-hole all around the opening, on an inner side of the annular reference surface, a thickness of the hole-side curved portion being reduced in a range less than the first length from the first flat surface toward the inner surface, the hole-side curved portion being curved with a curvature greater than that of the distal-end-side curved portion.

2. The vehicle stabilizer of claim 1, wherein a distance from an outer circumference of the annular reference surface to the distal end surface is less than a distance from the outer circumference of the annular reference surface so the opening.

3. The vehicle stabilizer of claim 2, wherein the hole-side curved portion includes a trim-side curved surface having a second length that is formed at a position near the trim portion, and a counter-trim-side curved surface having a third length that is formed on a side far from the trim portion, and the third length is less than the second length.

4. The vehicle stabilizer of claim 3, wherein a curvature of the counter-trim-side curved surface is greater than a curvature of the trim-side curved surface.

5. The vehicle stabilizer of claim 1, wherein the hole-side curved portion includes a trim-side curved surface having a second length that is formed at a position near the trim portion, and a counter-trim-side curved surface having a third length that is formed on a side far from the trim portion, and the third length is less than the second length.

6. The vehicle stabilizer of claim 5, wherein a curvature of the counter-trim-side curved surface is greater than a curvature of the trim-side curved surface.

* * * * *